(12) United States Patent
Caillaud et al.

(10) Patent No.: US 10,649,649 B2
(45) Date of Patent: May 12, 2020

(54) SECURE METHOD FOR CONTROL OF A FUNCTION BY MEANS OF A TOUCHPAD

(71) Applicant: THALES, Courbevoie (FR)

(72) Inventors: Maxime Caillaud, Merignac (FR); Patrick Joly, Merignac (FR); Cédric Balihaut, Merignac (FR)

(73) Assignee: THALES, Courbevoie (FR)

( * ) Notice: Subject to any disclaimer, the term of this patent is extended or adjusted under 35 U.S.C. 154(b) by 122 days.

(21) Appl. No.: 16/089,284

(22) PCT Filed: Mar. 27, 2017

(86) PCT No.: PCT/EP2017/057216
§ 371 (c)(1),
(2) Date: Sep. 27, 2018

(87) PCT Pub. No.: WO2017/167698
PCT Pub. Date: Oct. 5, 2017

(65) Prior Publication Data
US 2019/0114068 A1 Apr. 18, 2019

(30) Foreign Application Priority Data

Apr. 1, 2016 (FR) .................................... 16 00545

(51) Int. Cl.
| | | |
|---|---|---|
| G06F 3/0488 | (2013.01) | |
| G06F 3/01 | (2006.01) | |
| G06F 3/041 | (2006.01) | |
| G06F 3/0484 | (2013.01) | |
| G06F 21/36 | (2013.01) | |

(52) U.S. Cl.
CPC .......... *G06F 3/04883* (2013.01); *G06F 3/017* (2013.01); *G06F 3/0416* (2013.01); *G06F 3/04842* (2013.01); *G06F 21/36* (2013.01)

(58) Field of Classification Search
CPC .. G06F 3/04883; G06F 21/36; G06F 3/04842; G06F 3/0416; G06F 3/017
See application file for complete search history.

(56) References Cited

U.S. PATENT DOCUMENTS

| | | | |
|---|---|---|---|
| 8,046,721 B2 | 10/2011 | Chaudhri et al. | |
| 2008/0278455 A1 | 11/2008 | Atkins et al. | |
| 2013/0307825 A1* | 11/2013 | Czelnik | B60K 35/00 345/174 |
| 2014/0137049 A1* | 5/2014 | Jung | H04W 12/06 715/847 |

FOREIGN PATENT DOCUMENTS

| | | |
|---|---|---|
| EP | 2 731 002 A1 | 5/2014 |
| WO | 2014/060129 A1 | 4/2014 |

* cited by examiner

*Primary Examiner* — Huan V Doan
(74) *Attorney, Agent, or Firm* — Baker & Hostetler LLP

(57) ABSTRACT

Methods for the secure control of an apparatus by way of a system include a viewing device comprising a touch surface, a viewing screen and a processing and control unit. The secure control method comprises the following steps: displaying a first symbol corresponding to a first state of the apparatus and a second symbol corresponding to a second state; implementing the second state of the apparatus by way of a single continuous press on the touch surface starting on the first symbol, passing through a first crossing point, following a pattern comprising a part passing diagonally through a plurality of rows and columns of the matrix, passing through a second crossing point and finishing on the second symbol.

4 Claims, 3 Drawing Sheets

SECURE METHOD FOR CONTROL OF A FUNCTION BY MEANS OF A TOUCHPAD

CROSS-REFERENCE TO RELATED APPLICATIONS

This application is a National Stage of International patent application PCT/EP2017/057216, filed on Mar. 27, 2017, which claims priority to foreign French patent application No. FR 16/00545, filed on Apr. 1, 2016, the disclosures of which are incorporated by reference in their entirety.

FIELD OF THE INVENTION

The field of the invention is that of secure touch interfaces that are used notably in the avionics field as human-system interfaces.

BACKGROUND

One of the specific features of the aeronautical sector is that each display parameter and each interaction that a pilot is able to perform with the avionic system is defined by a 'safety' level of criticality that defines the criteria regarding integrity and availability of the hardware. For example, the level called 'hazardous' integrity level requires a probability of error of less than $10^{-7}$ per flight hour. Critical interactions have been performed, up until now, using dedicated control panels having the correct integrity level. For reasons regarding manufacturing and maintenance costs, but also for reasons regarding bulk, weight and electrical consumption, aviators are looking to reduce the number of control housings and to replace them with virtual equivalents that are displayed on the large touch-surface viewing screens of cockpits.

However, the essential condition for a control housing to be able to be 'virtualized' within a main screen is that this screen has at least the same level of criticality as the control housing that it is replacing. The inherent reliability of the components of a viewing screen means that the latter does not allow direct generation of highly critical commands. Thus, it is not possible simply to replace the action on one or more critical control buttons with a similar action on a touch surface.

Touch interaction means, notably capacitive ones, offer the option of performing a complex gesture able to be identified by the touchscreen, where a simple button allows only pressing and release functions to be applied. Thus, document U.S. Pat. No. 8,046,721, entitled 'Unlocking a device by performing gestures on an unlock image', proposes unlocking an electronic device by performing a particular 'gesture'.

However, an arbitrary gesture does not make it possible to ensure the required reliability. Specifically, some simple faults with the touch surface may have the same effect as a simple gesture. This is the case with what are called 'untimely' presses. The touchscreen sends an item of information without any press from the user. This item of information may correspond to an isolated press or a succession of presses on a row or a column. This is also the case with what are called 'erroneous' presses. When pressing on the screen, the latter sends incorrect coordinates that do not match the actual location of the press. Thus, the fault with the touchscreen may simulate simple gestures, such as a simple press, a long press, a press along a row or a column, and thus generate incorrect commands, which is not acceptable.

To solve this problem, in existing interactive systems, when it is desired to ensure that the interaction has indeed been requested by a user and does not result from a fault, what is called the 'guard' principle is used. This principle is implemented on mechanical control buttons that require a high degree of security. It consists in protecting the control button by way of a cover. The button is able to be used only after the cover has been lifted. This principle may be transposed to touch commands. As illustrated in FIG. 1, this principle consists in asking the user to perform two actions on a touch surface 1 to confirm his interaction. First of all, illustrated in the left-hand drawing of FIG. 1, the user performs a first press on a virtual button 2. The device then requests confirmation. This request may be made through a change in appearance of the virtual button. The user then performs a second press, as illustrated in the middle drawing. The device confirms the second press and performs the action. This confirmation may also be made through a second change in appearance of the virtual button, as illustrated in the right-hand drawing. However, this mechanism does not guarantee complete integrity of the touch surface. If the user lifts the guard and is interrupted in his task, a simple fault with the touchscreen may confirm activation.

SUMMARY OF THE INVENTION

The method for the secure control of a function by way of a touchscreen according to the invention does not exhibit these drawbacks. More precisely, the subject of the invention is a method for the secure control of an apparatus by way of a system comprising a viewing device comprising a touch surface formed of a matrix of conductive rows and columns, a viewing screen and a processing and control unit for said apparatus, said processing unit comprising a first assembly for processing positioning information coming from the touch surface and a second assembly for displaying graphical symbols on the viewing device, said secure control method comprising at least the following steps:

Displaying a first symbol corresponding to a first initial state of the apparatus;

Displaying a second symbol corresponding to a second state of the apparatus;

Implementing the second state of the apparatus by way of a single continuous press on the touch surface starting on the first symbol, passing through a first crossing point situated at the first symbol, following a pattern comprising a part passing diagonally through a plurality of rows and columns of the matrix, passing through a second crossing point situated at the second symbol and finishing on the second symbol.

Advantageously, the pattern is in the shape of a V or an inverted V.

Advantageously, a path, contained within the pattern, is shown by a third symbol linking the first symbol to the second symbol.

Advantageously, the second symbol is displayed only when the first symbol is called upon by being touched.

Advantageously, the first symbol and the second symbol are shown differently depending on whether the apparatus is in the first state or the second state.

BRIEF DESCRIPTION OF THE DRAWINGS

The invention will be better understood and other advantages will become apparent on reading the following description, which is given by way of nonlimiting example, and by virtue of the appended figures in which.

DETAILED DESCRIPTION

Figure 1:
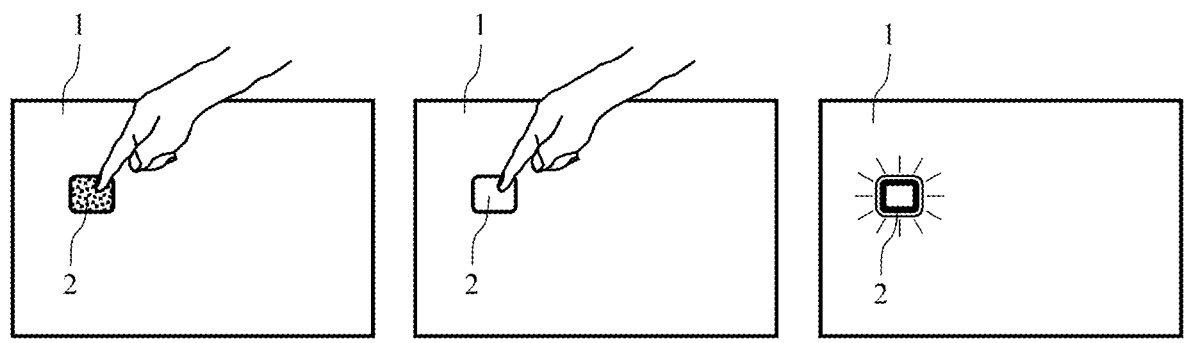
FIG. 1, already commented upon, shows the principle of the guarded button.
Figure 2:
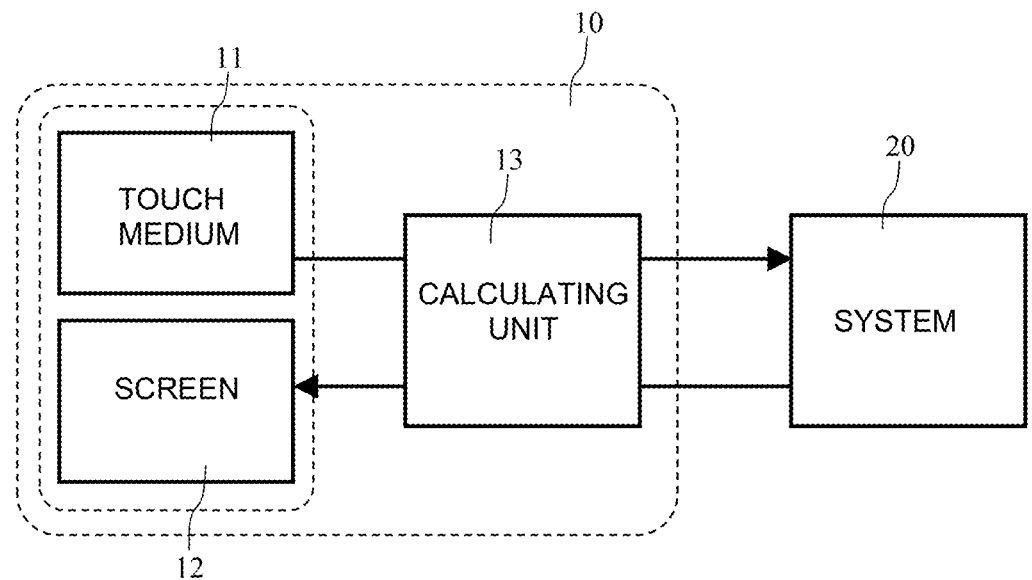
FIG. 2 shows a system for controlling an apparatus according to the invention.

By way of nonlimiting example, FIG. 2 shows a system 10 for controlling an apparatus or a system 20 according to the invention. It essentially comprises an interface or a transparent touch medium 11 arranged on a viewing screen 12. The method according to the invention may operate with all types of matrix touchscreens. By way of example, the implementation of the touchscreen may use what is called 'projected' capacitive detection, which consists in producing a detection matrix formed of conductive rows and columns that are arranged so as to detect local variations in capacitance introduced by the proximity of the fingers of the user or of any other designated object, provided that it is electrically conductive. The touchscreen comprises a touch controller whose role is to decode the information coming from the touchscreen.

The viewing screen is generally a flat liquid-crystal display screen. This touch medium-viewing screen assembly is connected to a calculating unit 13, which performs the following functions:

Generating the various graphical depictions of the symbols for the viewing device;

Comparing the information coming from the touch controller with a pre-recorded control mechanism;

Generating information for controlling the system 20.

As has been stated, the reliability of touch systems, although it is excellent, may prove to be insufficient for certain highly secure applications, in particular in the case of untimely or erroneous presses. By way of example, in the aeronautical field, when the reliability of the control corresponds to a level of loss of integrity of less than $10^{-7}$ per flight hour, a simple control method is no longer sufficient.

Figure 3:
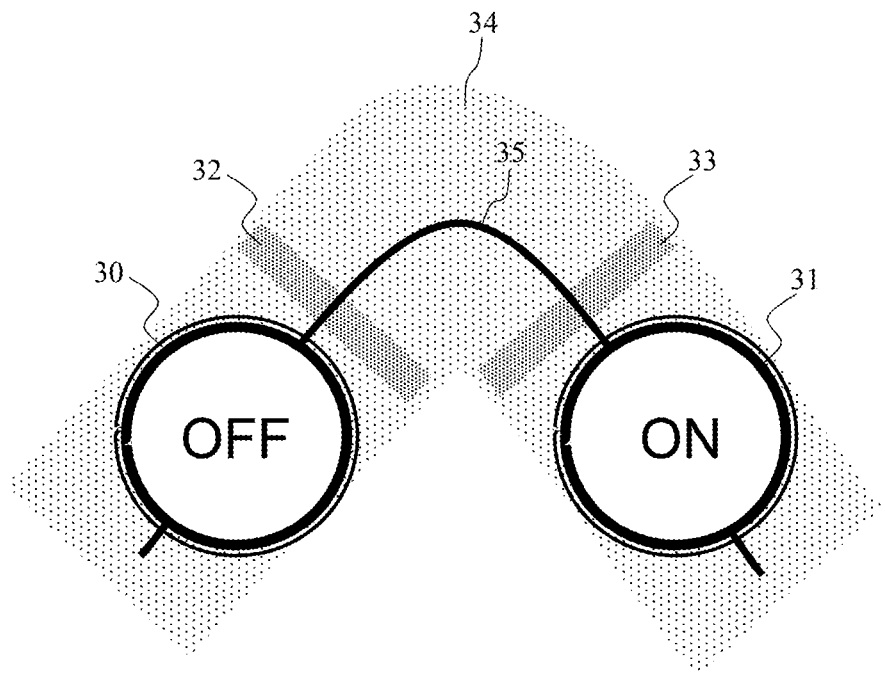
FIG. 3 shows the various graphical symbols displayed when the secure control method according to the invention is implemented.
Figure 4:
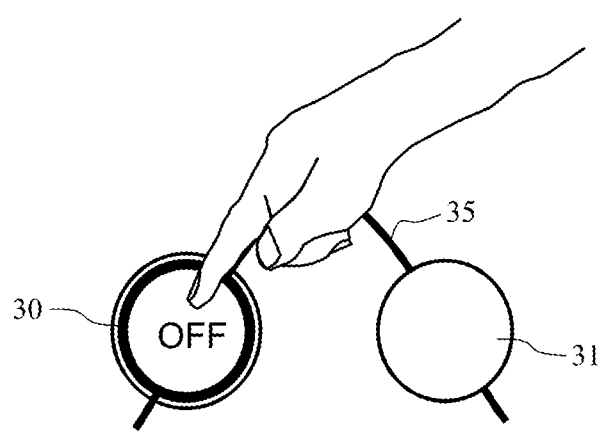
FIGS. 4 to 6 show the various steps of the method according to the invention.
Figure 5:
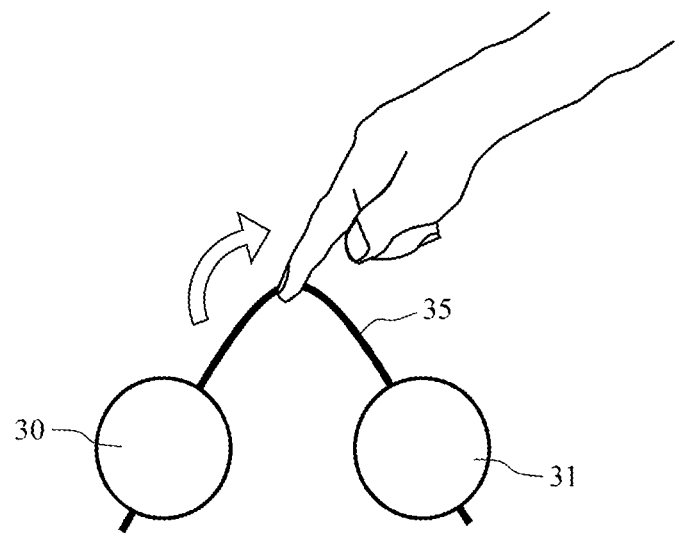
Figure 6:
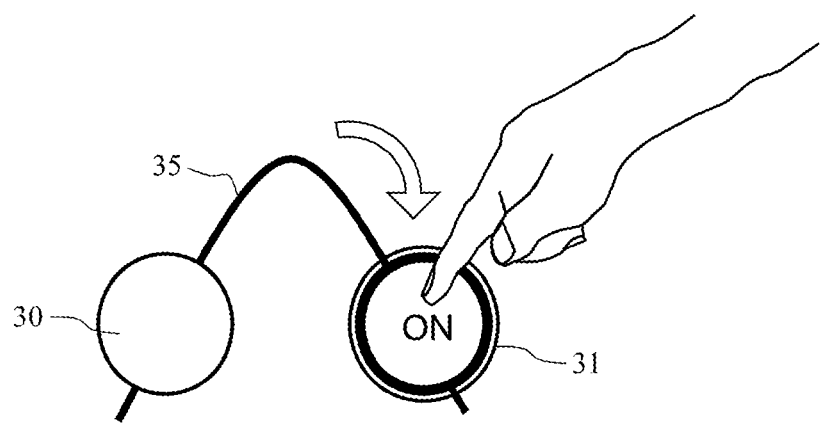

To mitigate these drawbacks, the secure control method according to the invention comprises a plurality of steps that are illustrated in FIGS. 3 to 6. FIG. 3 shows the various graphical symbols that are displayed when the secure control method according to the invention is implemented, and FIGS. 4 to 6 show the various steps of the method according to the invention, which are described in detail below. The method according to the invention may be used for any change in state of an apparatus. By way of example, FIGS. 3 to 6 illustrate the starting up or the shutting down of an apparatus.

Displaying a first symbol 30 corresponding to shutting down the apparatus and a second symbol 31 corresponding to putting the apparatus into service, the apparatus initially being shut down. It should be noted that the second symbol may be displayed only when the first symbol is called upon. By way of example, in FIGS. 3 to 6, these symbols are circles marked 'OFF' or 'ON'. The first symbol 30 and the second symbol 31 may be shown differently depending on whether the apparatus is in service or shut down, as is seen in the various figures;

Putting the apparatus into service by way of a single continuous press on the touch surface starting on the first symbol 30, passing through a first crossing point 32 situated at the first symbol, following a pattern 34, passing through a second crossing point 33 situated at the second symbol 31 and finishing on the second symbol. It should be noted that the crossing points and the pattern are not displayed. This putting into service is shown in FIGS. 4 to 6. By way of example, in FIG. 3, the crossing points 32 and 33 are symbolized by elongate rectangles. A path 35, contained within the pattern, is shown by a third symbol linking the first symbol to the second symbol. In the case of FIG. 3, the pattern and the path 35 are in the shape of an inverted V. Other shapes are possible, provided that the shape of the pattern comprises a part arranged so as to pass diagonally through a plurality of rows and columns of the matrix of the touchscreen. The pressing motion is symbolized by curved white arrows in FIGS. 5 and 6;

Shutdown of the apparatus by the reverse method. The user performs a continuous press on the touch surface starting on the second symbol 31, passing through the second crossing point 33, following the path 35, passing through the first crossing point 32 and finishing on the first symbol 30.

By this simple means, during the putting into service, the touch surface sends to the touch controller only information corresponding to successive touch coordinates, corresponding to both different rows and columns and press/release information. The shape of the template is not able to be reproduced by a simple fault with a component of the touch surface. The absence of detection of simple faults by the system is thus avoided, and the reliability of the touch medium is increased significantly.

This method is particularly well-suited to the putting into service of apparatuses requiring a high degree of security. In the avionic field, this method allows the performance of interactions with what is called a 'hazardous' level of criticality.

The invention claimed is:

1. A method for the secure control of an apparatus by way of a system, wherein the method comprises at least the following steps:

displaying a first symbol corresponding to a first initial state of the apparatus;

displaying a second symbol corresponding to a second state of the apparatus;

implementing the second state of the apparatus by way of a single continuous press on a touch surface starting on the first symbol, passing through a first crossing point situated at the first symbol, following a pattern comprising a part passing diagonally through a plurality of rows and columns of a matrix, passing through a second crossing point situated at the second symbol and finishing on the second symbol;

wherein the system comprises a viewing device comprising the touch surface formed of the matrix of conductive rows and columns, a viewing screen and a processing and control unit for said apparatus, said processing unit comprising a first assembly for processing positioning information coming from the touch surface and a second assembly for displaying graphical symbols on the viewing device, and wherein the second symbol is displayed only when the first symbol is called upon by being touched.

2. The method for the secure control of an apparatus as claimed in claim 1, wherein the pattern is in the shape of a V or an inverted V.

3. The method for the secure control of an apparatus as claimed in claim 1, wherein a path, contained within the pattern, is shown by a third symbol linking the first symbol to the second symbol.

4. The method for the secure control of an apparatus as claimed in claim 1, wherein the first symbol and the second symbol are shown differently depending on whether the apparatus is in the first state or the second state.

* * * * *